C. H. TALLMADGE.
CALCULATING MACHINE.
APPLICATION FILED JAN. 15, 1908.

1,051,827.

Patented Jan. 28, 1913.

Witnesses:
Fred C. Heuser
Leonard W. Novander

Inventor
Charles H. Tallmadge
By Bunn & Williams
Attorneys

C. H. TALLMADGE.
CALCULATING MACHINE.
APPLICATION FILED JAN. 15, 1908.

1,051,827.

Patented Jan. 28, 1913.
5 SHEETS—SHEET 3.

Witnesses:
Fred. O. Hunter
Leonard W. Novaeder

Inventor
Charles H. Tallmadge
By Brown & Williams
Attorneys

C. H. TALLMADGE.
CALCULATING MACHINE.
APPLICATION FILED JAN. 15, 1908.

1,051,827.

Patented Jan. 28, 1913.
5 SHEETS—SHEET 5.

Witnesses
Leonard W. Novander
George C. Higham

Inventor
Charles H. Tallmadge
By Browne Williams
Attorneys.

UNITED STATES PATENT OFFICE.

CHARLES H. TALLMADGE, OF CHICAGO, ILLINOIS, ASSIGNOR, BY MESNE ASSIGNMENTS, TO WILLIAM R. HEATH, OF BUFFALO, NEW YORK.

CALCULATING-MACHINE.

1,051,827.  Specification of Letters Patent.  Patented Jan. 28, 1913.

Application filed January 15, 1908. Serial No. 410,925.

*To all whom it may concern:*

Be it known that I, CHARLES H. TALLMADGE, a citizen of the United States, residing at Chicago, in the county of Cook and State of Illinois, have invented a certain new and useful Improvement in Calculating-Machines, (Case 7,) of which the following is a full, clear, concise, and exact description, reference being had to the accompanying drawings, forming a part of this specification.

My invention relates to calculating machines and in general may be regarded as an automatic multiplying device.
While some features of my invention may be employed in purely abstract multiplications or calculations, it is particularly useful in multiplications involving mixed numbers and translations of value from one scale to another.

One of the utilities of my present invention is the translation from pounds sterling of the English monetary system into United States dollars and cents, or vice versa. In constructing a machine for this purpose, I provide a register comprising a series of numeral wheels, one of each order in combination with carrying mechanism corresponding with the scale involved in one or the other system of values. This register is connected with an actuating mechanism in a ratio of gearing corresponding with the relative value of a unit in one system as compared with that of a unit in the other system. One operation of the actuating mechanism therefore causes an actuation of the register to indicate the value in units of one system, of one unit in the other system. Further operation of the mechanism causes the register to indicate in units of its scale, the value of the total number of units in the other scale, for which actuations have been made. Not only is there a single actuating mechanism corresponding with one denomination in the scale upon which the actuating mechanisms are arranged, but in the preferred form of my invention there is an actuating mechanism for each denomination in the scale. Each of these actuating mechanisms is geared to the register in a ratio corresponding with the value of a unit in the order to which it is assigned as expressed in units of the scale in accordance with which the numeral wheels of the register carry.
In the preferred form of my invention the actuating mechanisms operate directly upon the numeral wheels of higher orders as well as upon the numeral wheels of the lowest order, thus saving a large amount of operation of the lower orders which would otherwise be required in order to carry into the higher orders.

When my invention is to be used in the translation from pounds sterling to United States money equivalents, I provide a register composed of numeral wheels associated with suitable tens-carrying mechanism, conforming to the decimal scale of notation and from this register the amounts in dollars and cents are read. I provide also a set of ordered actuating mechanisms, as for example a pence actuating mechanism, a shillings actuating mechanism, a units of pounds actuating mechanism, a tens of pounds actuating mechanism, etc. Each of these actuating mechanisms includes a rotatable shaft upon which a number of actuating wheels are mounted. The manner of gearing the actuating wheels to the various numeral wheels of the register is such that one complete operation of the actuating mechanism of any order will directly advance the dollars wheel, the dimes wheel, the cents wheel and the mills wheel by amounts whose total is equivalent to one unit of that order in the sterling scale.

In order that the numeral wheels shall be free to be actuated by the carrying mechanisms as well as directly by the actuating mechanisms, I have devised a simple means for causing the actuating mechanisms directly to actuate the numeral wheels one at a time. This leaves all of the other numeral wheels free to be actuated by the carrying mechanisms when any one numeral wheel is being directly actuated by the actuating mechanisms.

All of these and other features of my invention will be more clearly understood by reference to the accompanying drawings, in which,—

In the first place my invention involves a register composed of numeral wheels and the associated carrying mechanisms. This register as illustrated in the drawings comprises the numeral wheels T, M, C, D, O and E, these numeral wheels being assigned respectively to the indication of tenths of mills, mills, cents, dimes, single dollars, and tens of dollars. Manifestly the number of numeral wheels may be carried up to provide for any desired order. All of these numeral wheels are loosely mounted upon a resetting spindle 20. Each of the numeral wheels is attached to an associated locating wheel 21, and to a driving gear 22, and also to a carrying disk 23, which is provided with two suitable carrying teeth 24—24, the numerals which designate the parts associated with each numeral wheel being supplied with indices $t$, $m$, $c$, $d$, $o$ or $e$, as the case may be. The function of the locating wheel is to coöperate with an associated locating detent $25^t$, $25^m$, etc., these detents serving to bring the numeral wheels into exact position for reading through the window W.

Figures 5, 6, 11:
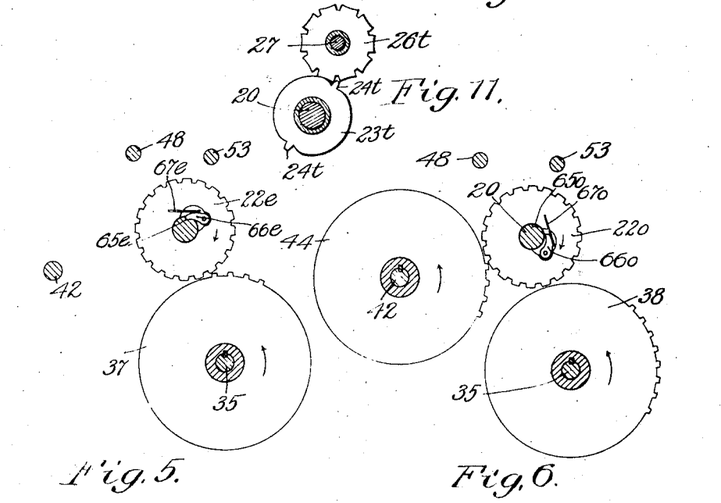
Figs. 5, 6, 7, 8, 9 and 10 are partial cross sectional views taken on the lines indicated by the arrows 5 to 10, inclusive of Fig. 1, these views being diagrammatic illustrations of portions of the gearing involved.
Fig. 11 is a detailed view of one of the carrying disks and the associated intermittent carrying wheel.

Each carrying mechanism comprises an intermittent carrying wheel actuated by the teeth of the carrying disk, the intermittent carrying wheel being attached through ratchet mechanism to a carrying pinion which is in mesh with the driving gear of the numeral wheel of the next higher order. It is through the operation of these parts that the numeral wheel of a given order is advanced through one space whenever the numeral wheel of the next lower order has been turned through an angle corresponding with the number of units which make up one unit of the higher order in the scale involved. Thus, for example, the intermittent carrying wheel $26^t$ is loosely mounted upon the actuating shaft 53 and is adapted to be actuated twice during each revolution of the numeral wheel T by one of the carrying teeth $24^t$. The contour of the intermittent carrying wheel and its relation to the carrying disk and carrying teeth are indicated in Fig. 11. It will be seen that the edge of the carrying disk projects within the periphery of the intermittent carrying wheel and thus prevents its rotation except when a carrying tooth passes the center line of the two wheels in which case the intermittent carrying wheel is moved through a one-tenth revolution. Upon the left hand face of each intermittent carrying wheel there is mounted a pawl 28 which engages with the teeth of a ratchet wheel 29. When, therefore, the numeral wheel rotating in the direction indicated by the arrow 30 in Fig. 3, moves through the zero position one of the carrying teeth 24 of the associated carrying disk will engage a notch in the periphery of the associated intermittent carrying wheel, causing a one-tenth rotation of the carrying wheel in the direction of the arrow 31. Rotation of the carrying wheel in this direction will cause the pawl 28 to engage a tooth of the ratchet wheel 29 to cause a one-tenth revolution of the ratchet wheel in the direction of the arrow 31. The ratchet wheel is formed on a sleeve which is integral with an associated carrying pinion 32. In the case of all of the numeral wheels, except that of the lowest order, there is attached to the numeral wheel a carrying gear 33 in mesh with the carrying pinion which carries up from the next lower order. The result is that whenever the numeral wheel of a lower order is turned through the zero position the carrying gear train will be rotated to cause a one space rotation of the numeral wheel of the next higher order. The reason for the ratchet connection between the intermittent carrying wheel and the carrying pinion will subsequently appear. Each of the numeral wheels as shown in the drawings is provided with two sets of digits from zero to nine inclusive, and it is for this reason that the carrying disks are each provided with two carrying teeth. This particular number of carrying teeth and sets of digits for each numeral wheel is selected on account of the convenient size which it enables the designer to adopt in laying out the gearing.

Figure 3:
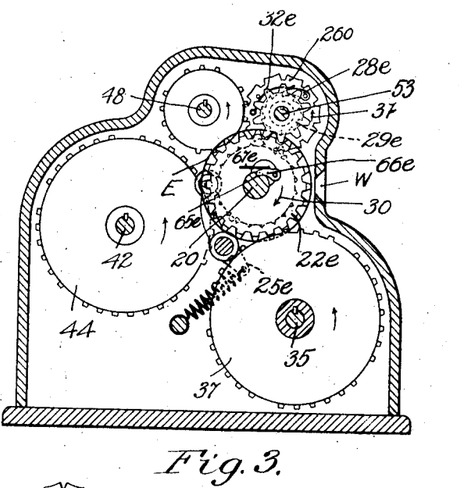
Fig. 3 is a cross sectional view taken on the line 3—3 of Fig. 1, as indicated by heavy arrows.
Figure 4:
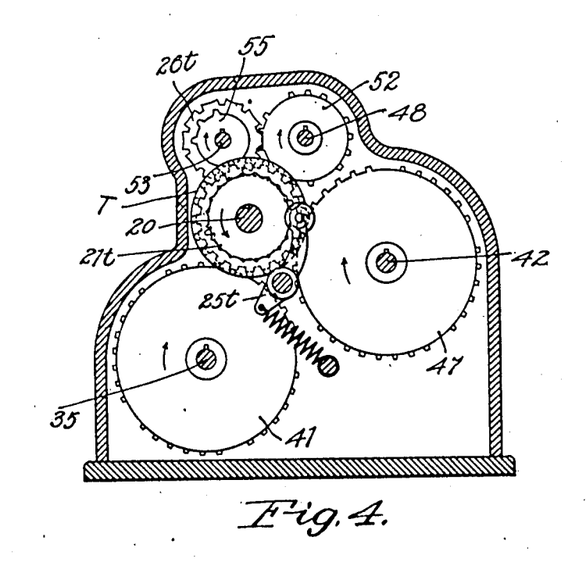
Fig. 4 is a cross sectional view taken on line 4—4 of Fig. 1, as indicated by the heavy arrows.

It will be apparent that any amount in dollars and decimals of dollars may be set up by proper rotations of the numeral wheels of the register. Furthermore the ratchet device in the carrying mechanism will enable one to advance a numeral wheel of higher order without affecting the position or causing rotation of a numeral wheel of lower order. Thus, for example, if one were to advance the tens of dollars numeral wheel $e$ he would cause a rotation of the associated carrying pinion $32^e$ in the direction of the arrow 31, as shown in Fig. 3. Such rotation of the carrying pinion would cause rotation in the same direction of the ratchet wheel $29^o$. Such rotation of the ratchet wheel, however, would not cause a corresponding movement of the associated intermittent carrying wheel 26° because the pawl 28° would slip over the ratchet teeth. It will be apparent, therefore, that any numeral wheel may be advanced without effecting a rotation of the numeral wheels of lower order, but advancement of any numeral wheel will cause proper carrying into the numeral wheels of higher order, whenever the numeral wheel of lower order is advanced through the zero position.

Figure 1:
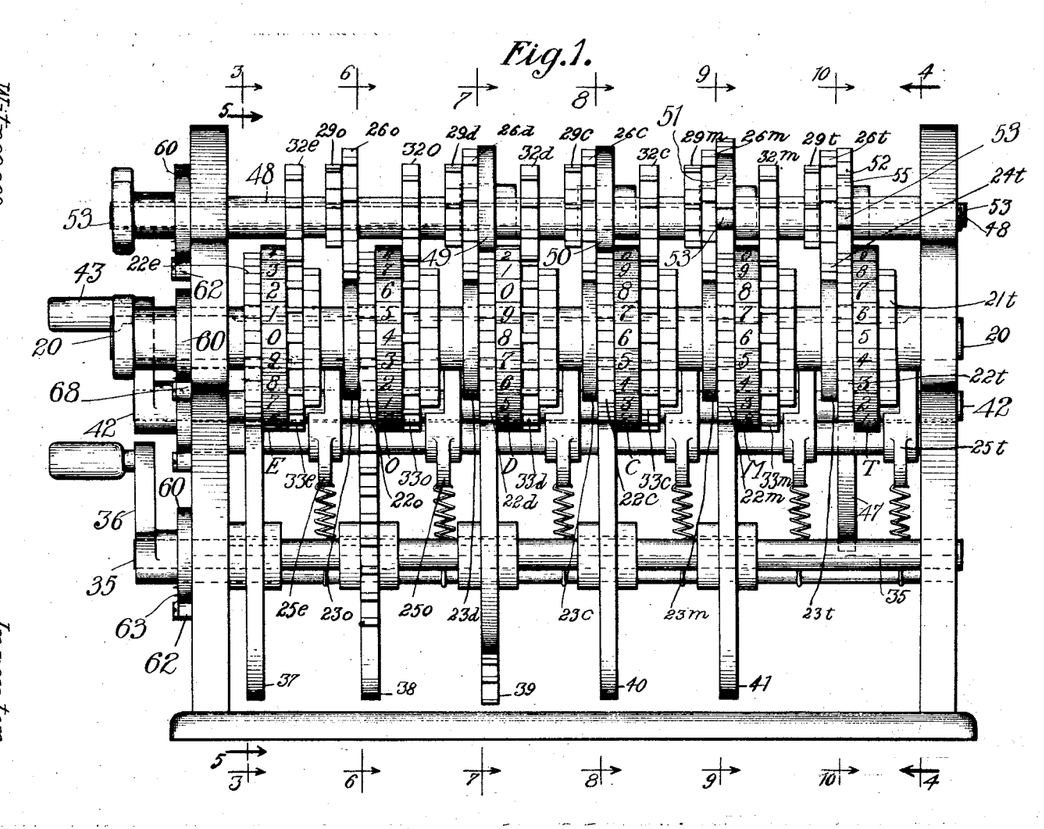
Figure 1 is a front elevation of the translating or calculating machine, the cover being removed in order to reveal more clearly the interior mechanism.

The value of one pound sterling in English money is 4.8665 dollars, as expressed in United States money. In order, therefore, to cause the numeral wheels of the register to indicate in dollars the value of one pound sterling, it would be necessary to advance the units of dollars numeral wheel O from its zero position to the position in which the numeral 4 would appear behind the window W, to advance the dimes wheel D to the eighth position, the cents wheel to the sixth position, the mills wheel to its sixth position, and the tenths of mills wheel to its fifth position, all as indicated in Fig. 1 of the drawing. My invention provides an actuating shaft equipped with actuating wheels for advancing these numeral wheels through the number of spaces above indicated upon each actuation. In order, therefore, to translate one pound into United States money equivalents, the units of pounds actuating shaft is turned through one complete revolution. If the numeral wheels of the register were in their zero positions prior to the commencement of this revolution of the actuating shaft, they will indicate $4.8665 upon the completion of one such revolution of the actuating shaft. A second revolution of the actuating shaft will cause a similar advancement of these numerals wheels, causing a total of $9.7330 to appear through the window W. Additional revolutions of the units of pounds actuating mechanism will cause additional rotation of the numeral wheels with corresponding indications of the totals expressed in dollars and decimal fractions thereof. Similar actuating mechanisms are provided for advancing the numeral wheels by amounts corresponding with shillings, pence, etc.

With this preliminary explanation I shall first describe in detail the tens of pounds actuating mechanism.

Figure 7:
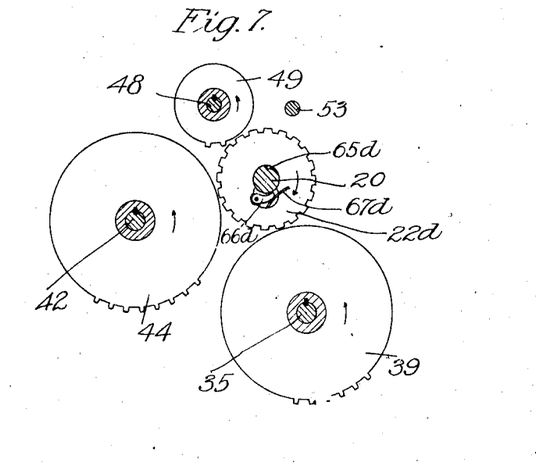
Figure 8:
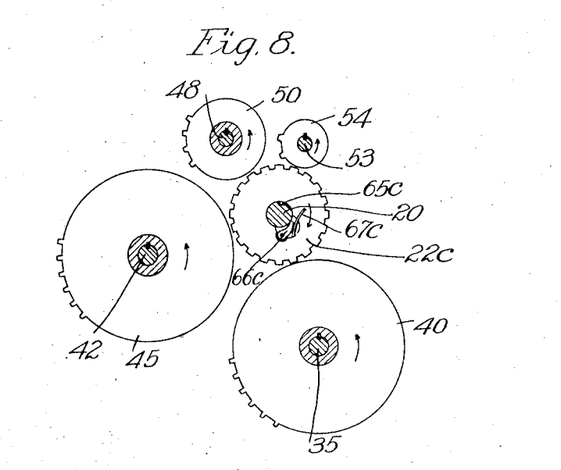
Figures 9, 10:
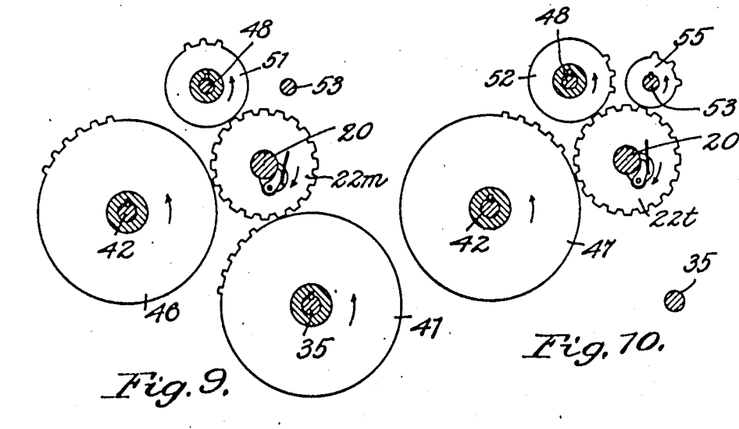
Figure 12:
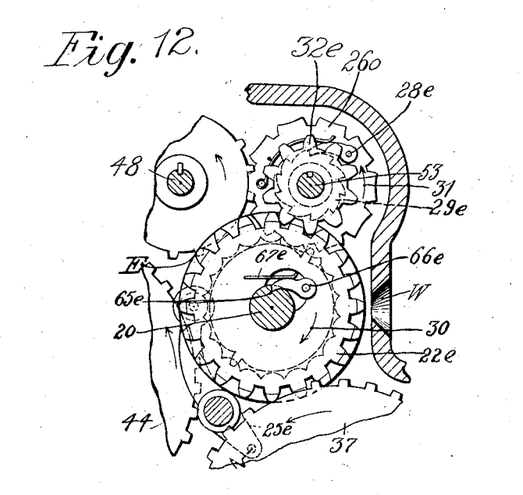
Fig. 12 is an enlarged view of the parts shown in the upper right-hand corner of Fig. 3.
Figure 13:
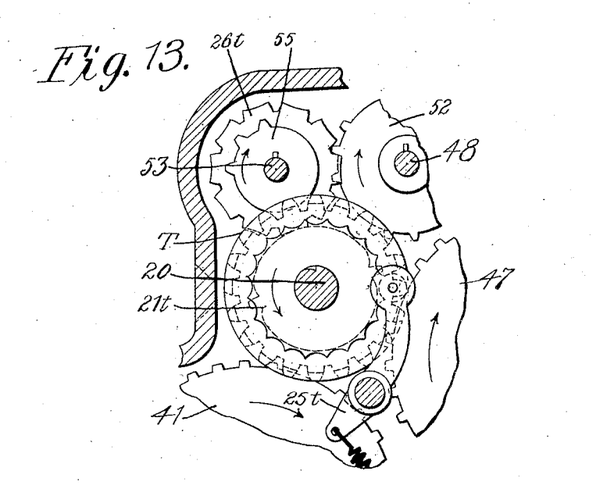
Fig. 13 is an enlarged view of the parts shown in the upper right-hand corner of Fig. 4.

The tens of pounds actuating shaft is indicated at 35, this shaft being equipped at its exposed end with the operating crank 36. Since ten pounds are equal to $48.665 as expressed in United States money, the tens of pounds actuating shaft is provided first with an actuating wheel 37, this wheel being provided with four teeth. The various diagrammatic figures 5 to 10 inclusive show the actuating gears in their normal position. It will be noted that the gear 37 is in such a position that upon the commencement of a counter-clockwise rotation of the shaft 35, the four gear teeth of the wheel 37 will immediately engage the teeth of the driving gear $22^e$ of the tens of dollars numeral wheel E and cause its advancement through four spaces. The second actuating gear 38 of the tens of pounds actuating mechanism is provided with eight teeth, as best illustrated in Fig. 6. These eight teeth are placed in an angular position upon the periphery of the wheel 38, such that they will not engage the teeth of the driving gear $22^c$ of the units of dollars numeral wheel until after the teeth of the first actuating gear 37 have passed out of engagement with the teeth of the driving gear of the numeral wheel E. The continued rotation of the actuating shaft 35 will, however, cause the eight teeth of the actuating gear 38 to advance the units of dollars numeral wheel to its eighth position. The next actuating gear 39 of the tens of pounds actuating mechanism is provided with six teeth as best illustrated in Fig. 7. These teeth are placed in such an angular position upon the periphery of the wheel 39 that after the teeth of the gear 38 have passed out of mesh with the teeth of the driving gear $22^c$, the teeth of the gear 39 will mesh with the teeth of the driving gear $22^d$ to cause the advancement of the numeral wheel D through six spaces. In like manner the next actuating gear 40 of the tens of pounds actuating mechanism is provided with six teeth so placed as to engage the driving gear of the cents numeral wheel C and cause its advancement through six spaces after the six-space advancement of the numeral wheel D has been completed. The tens of pounds actuating mechanism contains also an actuating gear 41 provided with five teeth as indicated in Fig. 9, and these five teeth engage the driving gear of the mills numeral wheel M to cause its five-space advancement after the direct advancement of the cents numeral wheel has been completed by the actuating wheel 40.

The translation from tens of pounds to United States money equivalents involves no change in the tenths of mills order, and, therefore, the tens of pounds actuating shaft requires no actuating gear for advancing the tenths of mills numeral wheel. Fig. 10, therefore, shows the tens of pounds actuating shaft 35 to be without any actuating wheel in the tenths of mills position. It will be understood, of course, that these diagrammatic views shown in Figs. 5 to 10 inclusive, may be regarded as sectional slices of the mechanism. Whatever gear wheels or projecting teeth would appear behind the plane on which the next section is taken, are not shown in these diagrammatic views.

In view of the explanation previously made it will be apparent that a single rotation of the tens of pounds actuating shaft by means of the crank 36, will cause the four-space advancement of the numeral wheel E, the eight-space advancement of the numeral wheel O, the six-space advancement of the numeral wheel D, the six-space advancement of the numeral wheel C, and the five-space advancement of the numeral wheel m, so that a single revolution will cause the indication of $48.665. Subsequent revolutions of tens of pounds actuating shaft will cause a repeated advancement of the various numeral wheels to indicate the total value in dollars and cents of the number of tens of pounds which is to be translated. It will, of course, be apparent that after a single actuation of the tens of pounds mechanism, the units of dollars numeral wheel will be in its eighth position. The subsequent eight-space advancement of this numeral wheel will require the carrying of one ten dollars into the tens of dollars numeral wheel. This will, of course, be accomplished by the carrying mechanism previously described. Such carrying will not be interfered with by the actuating wheel 37, because the teeth of this wheel will have passed out of mesh with the driving gear 22° before the second actuating wheel 38 begins to drive the numeral wheel O, and, therefore, before any carrying will be required. In like manner all of the numeral wheels will carry into the numeral wheel of next higher order, whenever they pass through the zero position, and in no instance will the actuating wheels or driving gears interfere with such carrying because the teeth of the actuating wheels always pass out of mesh with the associated driving gears before there is occasion to carry up from a lower order.

The units of pounds actuating shaft is shown at 42 and, like the tens of pounds actuating shaft, it is provided with a drive crank 43. The diagrammatic views of the actuating gears show that this shaft is provided with no gear in the position occupied by the driving gear of the numeral wheel of highest order E. This is due, of course, to the fact that one pound is equivalent to only $4.8665, and the registration of a single pound will not require any advancement of the tens of dollars numeral wheel. In the second position which is occupied by the drive gear of the units of dollars numeral wheel O, the units of pounds actuating shaft 42 is provided with a four-toothed actuating gear 44. In the third position, occupied by the driving gear of the dimes numeral wheel D, the units of pounds actuating shaft is provided with an eight-toothed actuating gear 44. In the fourth position which is occupied by the driving gear of the cents numeral wheel C, this actuating shaft is provided with a six-toothed gear 45. In the next position which is occupied by the driving gear of the mills numeral wheel M, the units of pounds actuating shaft is provided with a six-toothed wheel 46, and in the last position, which is occupied by the tenths of mills numeral wheel T, the units of pounds actuating shaft is provided with a five-toothed actuating wheel 47. The angular position of the teeth on these various wheels is, as in the previous instance, so arranged that the teeth of each wheel will pass out of mesh with the associated driving gear before the teeth of the next succeeding wheel come into mesh, and thus there is no interference with the immediate carrying from any numeral wheel of lower order into a numeral wheel of higher order.

The shilling of the English monetary system is equivalent to $.243325. While it would be possible and perhaps feasible to provide additional numeral wheels to take account of this fraction to six places, I do not believe it is practically necessary to go beyond tenths of mills. In constructing my machine I have, therefore, disregarded the last two significant figures and have provided an actuating mechanism to involve the register with $.2433 for each rotation of the shillings actuating mechanism. The shillings actuating shaft is shown at 48, but for obvious reasons is provided with no actuating wheel in either the first or second position. In the third position, indicated in Fig. 7, the shillings shaft is provided with the actuating wheel 49, this wheel being provided with two teeth adapted for engagement with the teeth of the driving gear of the dimes numeral wheel D. In the fourth position the shillings actuating shaft 48 is provided with a four-toothed actuating wheel 50 and in the fifth and sixth positions the shillings shaft is provided with three-toothed actuating wheels 51 and 52, these wheels being adapted for engagement with the proper driving gears of the numeral wheels of the register. Each complete revolution of the shillings actuating shaft will cause, therefore, a two-space advancement of the dimes numeral wheel D, a four-space advancement of the cents numeral wheel C, a three-space advancement of the mills numeral wheel M, and a three-space advancement of the tenths of mills numeral wheel T.

The pence actuating shaft is indicated at 53. Since one penny in the English system is equivalent to $.020277$\frac{1}{12}$, I have arranged my mechanism to render this translation as $.0203, which is the nearest four place value that can be assigned, and this value I regard as a sufficiently close approximation for all practical purposes. For obvious reasons no actuating wheel is required in either the first, second or third position, but in the fourth position, which is occupied by the driving gear of the cents numeral wheel C, the pence actuating shaft 53 is provided with a two-toothed actuating wheel 54. In the mills position the pence shaft is provided with no actuating wheel, but in the tenths of mills position it is provided with a three-toothed actuating wheel 55. Each complete revolution of the pence actuating shaft will, therefore, cause a two-space advancement of the cents wheel, no advancement of the mills numeral wheel, but a three-space advancement of the tenths of mills numeral wheel.

Since all of the carrying wheels and pinions and their associated ratchet mechanisms are loosely mounted upon their shaft, I have for convenience mounted these parts upon the pence actuating shaft. The pence actuating wheels are, of course, keyed to the pence actuating shaft, but the rotation of the pence actuating shaft does not affect the carrying wheels or pinions; neither does the rotation of the carrying pinions affect the pence actuating shaft. The shillings actuating shaft and the pence actuating shaft are provided with knurled knobs at the left hand end in the place of cranks, such as are applied to the pounds actuating shafts.

Each of the actuating shafts is provided with a locating disk 60 just outside the frame work at the left hand end of the machine. Each of these disks has a notch or depression into which the tooth 61 of the associated detent lever 62 drops when the actuating shaft is in its normal position. The normal position of the actuating shaft is, of course, that in which none of the teeth of the actuating wheels is in mesh with any of the driving gears. The light spring 63 tends to draw the tooth of the lever into the notch of the locating disk so that the operator will find it easy to give the actuating shaft a full revolution,—neither more nor less.

Figure 2:
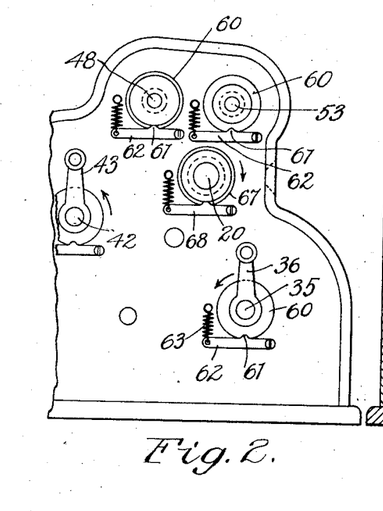
Fig. 2 is an end elevation of the major part of the machine.

If now the operator desires to translate eleven pounds, two shillings and two pence into United States money, he first grasps the crank of the tens of pounds actuating shaft and turns this shaft through one complete revolution in the direction of the arrow shown in Fig. 2. A slight pressure on the crank is sufficient to disengage the tooth of the locating lever and permit the free rotation of the shaft. The detent tooth will, however, drop into the notch upon the completion of a single revolution, so that the operator will have no difficulty in stopping the rotation at the proper point. The operator next turns the crank of the units of pounds actuating shaft one full revolution in the direction of the arrow shown in conjunction with this actuating crank. Next the shillings actuating shaft is turned through two complete revolutions. The clicking of the detent mechanism aids the operator in counting the number of revolutions. Next the pence actuating shaft is turned through two complete revolutions. The operation and results may be tabulated as follows:

| English money. | Equivalent value in United States money. |
|---|---|
| 10 pounds | $48.665000 |
| 1 pound | 4.866500 |
| 2 shillings | .486650 |
| 2 pence | .040554⁴⁄₁₁ |
| £11 2s. 2d. | 54.058704⁴⁄₁₁ |

| English money. | Revolutions actuating shafts. | Approximate equivalent value in United States money as indicated by machine. |
|---|---|---|
| 10 pounds | 1 tens of pounds | $48.665 |
| 1 pound | 1 units of pounds | 4.8665 |
| 2 shillings | 2 shillings | .4865 |
| 2 pence | 2 pence | .0406 |
|  |  | 54.0587 |

The result of the multiplication is, of course, read through the window W from the numeral wheels.

If, as is likely to be the case, the operator next desires to make another translation of some other amount expressed in pounds sterling, it will be necessary to return the numeral wheels to their zero position in order that the result may be read directly without the necessity of subtracting from the final result the amount indicated by the numeral wheels at the commencement of the translation. My invention provides means for returning the numeral wheels to their zero position. It will be noted in all of the sectional views that the shaft 20 upon which the numeral wheels are loosely mounted is provided with a ratchet-like depression 65. Each of the numeral wheels is provided with a pivoted pawl 66, and a spring 67, which exerts a pressure upon the pawl. The numeral wheels are free to be advanced in the direction of the arrows applied to them without interference by the pawl and ratchet mechanism. Rotation in the direction of the arrows, only, is required in making the translations for which the machine is primarily intended. After the completion of a calculation the numeral wheels will be left in various angular positions with respect to the zero position. Thus when the reading of the register is $4.8665 the first numeral wheel E will be in its zero position, the other numeral wheels will be respectively in their fourth, eighth, sixth, sixth and fifth positions. If, now, it is desired to return all of the numeral wheels to zero, the numeral wheel shaft 20 is given one complete revolution in the direction of the arrow shown in association with the numeral wheel shaft in Fig. 2, the resetting knob 69, being provided for this purpose. As the numeral wheel shaft is rotated the ratchet-like depression will engage the pawl of the first numeral wheel E, and cause it to rotate a full revolution with the numeral wheel shaft until the shaft returns to its normal zero position as determined by the locating disk 67 and the detent lever 68. When the numeral wheel shaft has been rotated through an angle equal to four spaces on the numeral wheels, the ratchet tooth will engage the pawl of the second numeral wheel O, whereupon the rotation of this numeral wheel will be continued until the numeral wheel shaft has reached its zero position. So in like manner the continued rotation of the shaft will pick up in turn the numeral wheels T, M and C, and D, thereupon carrying all of them with the numeral wheel shaft into the normal zero position. The position of the pawls on the numeral wheels is, of course, such that when, after a complete revolution, the numeral wheel shaft is returned to its normal position, the zero positions of all of the numeral wheels will be in alinement with the window W. After such resetting of the register to its zero position another calculation can be performed in the manner previously described.

It will be manifest that I have described in detail only a single embodiment of my invention, which may be modified as may be required for a large number of specific purposes. I do not wish, therefore, to limit myself to the precise details of construction herein set forth.

What I claim as new and desire to secure by Letters Patent, is:

1. In a calculating machine, the combination of a register comprising ordered numeral wheels and carrying mechanisms associated therewith, an actuating mechanism, and permanent gearing between the actuating mechanism and the register in the ratio of a factor in the multiplication to be effected.

2. In a calculating machine, the combination of a register comprising ordered numeral wheels and carrying mechanism associated therewith, an actuating mechanism, and fixed gearing between the register and the actuating mechanism in the ratio of a unit in one scale of notation to its value as expressed in units in another scale of notation.

3. In a calculating machine, the combination of a register comprising ordered numeral wheels carrying on one scale of notation and actuating mechanisms permanently ordered on another scale of notation and each adapted to actuate the numeral wheels of the register by an amount equal to the value of a unit in the scale upon which the actuating mechanisms are ordered, as expressed in the scale upon which the numeral wheels are arranged to carry.

4. In a calculating machine, the combination of a register having numeral wheels carrying in accordance with one monetary system, a plurality of actuating mechanisms, one for each order in another monetary system, and gearing connecting each actuating mechanism with the numeral wheels of the register in the ratio of one to the value of a unit in the order to which that actuating mechanism is assigned as expressed in units of the scale upon which the numeral wheels are arranged to carry.

5. In combination, a set of decimally ordered numeral wheels, tens-carrying mechanisms for carrying from lower numeral wheels into numeral wheels of higher order, an actuating mechanism for each order in the English monetary scale, and fixed gearing connecting each actuating mechanism directly with the several numeral wheels in the ratio of the value of a unit of the order to which that actuating mechanism is assigned as expressed in the United States monetary scale.

6. In combination, a set of decimally ordered numeral wheels, a tens-carrying mechanism for carrying from each numeral wheel into a numeral wheel of higher order, ratchet and pawl mechanism included in each carrying mechanism, a separate actuating mechanism for each of the several orders in the English monetary scale, and permanently set gearing connecting each actuating mechanism directly with the several numeral wheels in the ratio of one to the value of a unit of the order to which that actuating mechanism is assigned as expressed in the United States monetary scale.

7. In combination, a set of decimally ordered numeral wheels, tens-carrying mechanisms for carrying from lower numeral wheels into numeral wheels of higher order a separate actuating mechanism for each order in the English monetary scale, permanent gearing for connecting each actuating mechanism directly with the several numeral wheels in the ratio of one to the value of a unit of the order to which that actuating mechanism is assigned as expressed in the United States monetary scale, and means for re-setting the numeral wheels simultaneously to their zero position.

8. In combination, a set of decimally ordered numeral wheels, tens-carrying mechanisms for carrying from each numeral wheel into a numeral wheel of higher order, ratchet and pawl mechanism included in each carrying mechanism, an actuating mechanism for each of the several orders in the English monetary scale, fixed gearing connecting each actuating mechanism directly with the several numeral wheels in the ratio of one to the value of a unit of the order to which that actuating mechanism is assigned as expressed in the United States monetary scale, and means for re-setting the numeral wheels simultaneously to their zero position.

9. In combination, a set of decimally ordered numeral wheels, tens-carrying mechanisms for carrying from lower numeral wheels into numeral wheels of higher order, ratchet and pawl mechanism included in each carrying mechanism, an actuating mechanism for each of several orders in the English monetary scale, permanent gearing connecting each actuating mechanism directly with the several numeral wheels in the ratio of one to the value of a unit of the order to which that actuating mechanism is assigned as expressed in the United States monetary scale and a re-setting shaft upon which the numeral wheels are mounted and having a ratchet and pawl connection with said numeral wheels.

10. In combination, a set of numeral wheels arranged in accordance with one scale of notation, carrying mechanism for carrying in accordance with that scale of notation from lower numeral wheels into numeral wheels assigned to higher denominations, an actuating mechanism for each of several denominations in another scale of notation, and fixed gearing connecting each actuating mechanism directly with the several numeral wheels in the ratio of one to the value of a unit of the denomination to which that actuating mechanism is assigned as expressed in units of the scale of notation upon which the numeral wheels are arranged to carry.

11. In combination, a set of numeral wheels assigned to several denominations in accordance with one scale of notation, carrying mechanisms for carrying from one numeral wheel to another in accordance with such scale of notation, ratchet and pawl mechanism included in each carrying mechanism, an actuating mechanism for each denomination in another scale of notation, permanent gearing connecting each actuating mechanism with the several numeral wheels in the ratio of one to the value of a unit of the denomination to which that actuating mechanism is assigned as expressed in units of the denominations of the scale in accordance with which the numeral wheels are arranged to carry, and means for re-setting the numeral wheels to their zero position.

12. In combination, a set of decimally ordered numeral wheels, tens-carrying mechanisms for carrying from one numeral wheel into another, a pence actuating mechanism, a shillings actuating mechanism, and a pounds actuating mechanism, each of said actuating mechanisms comprising a means for directly actuating a numeral wheel of one order and means for directly actuating other numeral wheels of other orders, the ratio of gearing between the several numeral wheels and the actuating means of any one order being equal to the value of a unit of that order in the sterling scale as expressed in units of United States monetary scale.

13. In combination, a set of decimally ordered numeral wheels, tens-carrying mechanisms for carrying from one numeral wheel into another, a ratchet and pawl mechanism included in each carrying mechanism, a pence actuating mechanism, a shillings actuating mechanism, and a pounds actuating mechanism, each of said actuating mechanisms comprising a means for directly actuating a numeral wheel of one order and means for directly actuating other numeral wheels of other orders, the ratio of gearing between the several numeral wheels and the actuating means of any one order being equal to the value of a unit of that order in the sterling scale as expressed in units of the United States monetary scale.

14. In combination, a set of decimally ordered numeral wheels, tens-carrying mechanisms for carrying from one numeral wheel into another, a ratchet and pawl mechanism included in each carrying mechanism, a pence actuating mechanism, a shillings actuating mechanism, and a pounds actuating mechanism, each of said actuating mechanisms comprising a means for directly actuating a numeral wheel of one order and means for directly actuating other numeral wheels of other orders, the ratio of gearing between the several numeral wheels and the actuating means of any one order being equal to the value of a unit of that order in the sterling scale as expressed in units of the United States monetary scale, and means for resetting the numeral wheels simultaneously to their zero position.

15. In combination, a set of decimally ordered numeral wheels, tens-carrying mechanisms for carrying from one numeral wheel into another, a ratchet and pawl mechanism included in each carrying mechanism, a pence actuating mechanism, a shillings actuating mechanism and a pounds actuating mechanism, each of said actuating mechanisms comprising a means for actuating a numeral wheel of one order and means for directly actuating successively other numeral wheels of other orders, the ratio of gearing between the several numeral wheels and the actuating means of any one order being equal to the value of a unit of that order in the sterling scale as expressed in units of the United States monetary scale.

16. In combination, a set of decimally ordered numeral wheels, tens-carrying mechanisms for carrying from one numeral wheel into another, a ratchet and pawl mechanism included in each carrying mechanism, a pence actuating mechanism, a shillings actuating mechanism and a pounds actuating mechanism, each of said actuating mechanisms comprising a means for actuating a numeral wheel of one order and means for directly actuating successively other numeral wheels of other orders, the ratio of gearing between the several numeral wheels and the actuating means of any one order being equal to the value of a unit of that order in the sterling scale as expressed in units of the United States monetary scale, a common shaft upon which the numeral wheels are mounted and a ratchet and pawl mechanism interposed between the shaft and the numeral wheels whereby the shaft may be rotated to re-set the numeral wheels to zero.

17. In combination, a register comprising a set of decimally ordered numeral wheels, a driving gear associated with each numeral wheel, tens-carrying mechanisms for carrying from one numeral wheel into another, a ratchet and pawl mechanism included in each carrying mechanism to permit the forward rotation of a numeral wheel of one order without affecting a numeral wheel of lower order, a set of actuating mechanisms, each assigned to one order in the English monetary scale, and each comprising an actuating shaft, an indicating detent therefor and a plurality of actuating wheels, said actuating wheels being adapted for successive operative engagement during a part of the revolution of the associated actuating shaft with driving gears of numeral wheels of the register, the ratio of gearing between the several actuating wheels of the actuating mechanism of any order and the several numeral wheels of the register being such that a single operation of the actuating mechanism will cause an advancement of the ordered numeral wheels by amounts whose sum is equal to the value of a unit in that order as expressed in units of the United States monetary scale.

18. In combination, a register comprising a set of decimally ordered numeral wheels, a driving gear associated with each numeral wheel, tens-carrying mechanism for carrying from one numeral wheel into another, a ratchet and pawl mechanism included in each carrying mechanism to permit the forward rotation of a numeral wheel of one order without affecting a numeral wheel of lower order, a set of actuating mechanisms, each assigned to one order in the English monetary scale, and each comprising an actuating shaft, and a plurality of actuating wheels, said actuating wheels being adapted for successive operative engagement during a part of the revolution of the associated actuating shaft with driving gears of numeral wheels of the register, the ratio of gearing between the several actuating wheels of the actuating mechanism of any order and the several numeral wheels of the register being such that a single operation of the actuating mechanism will cause an advancement of the ordered numeral wheels by amounts whose sum is equal to the value of a unit in that order as expresesd in units of the United States monetary scale.

19. In combination, a register comprising a set of numeral wheels each assigned to one denomination of one scale of values, carrying mechanisms for carrying from one numeral wheel into another in accordance with said scale of values, a ratchet and pawl mechanism included in each carrying mechanism to permit the forward rotation of a numeral wheel of one order without affecting a numeral wheel of lower order, a set of actuating mechanisms each assigned to one denomination in some other scale of values and each comprising an actuating shaft, an indicator associated therewith, and a plurality of actuating wheels, said actuating wheels being adapted for successive operative engagement during a part of the revolution of the associated actuating shaft with driving gears of numeral wheels of the register, the ratio of gearing between the several actuating wheels of the actuating mechanism assigned to any one denomination and the several numeral wheels of the register being such that a single operation of the actuating mechanism will cause an advancement of the numeral wheels assigned to the several denominations of the other scale of values by amounts whose sum is equal to the value of a unit of the denomination to which the actuating mechanism is assigned as expressed in units of the denominations of the scale of values in accordance with which the numeral wheels are arranged to carry.

20. In combination, a register comprising a set of numeral wheels, a driving gear for each numeral wheel, carrying mechanisms adapted to carry from one numeral wheel into another, a ratchet and pawl mechanism included in each carrying mechanism, an actuating shaft, a plurality of actuating wheels on said shaft, a set of teeth on each actuating wheel, the teeth on each wheel being adapted to mesh with the driving gear of one of the numeral wheels and the several numeral wheels being angularly displaced relative to each other whereby the rotation of the actuating shaft will cause the successive advancement of the several numeral wheels.

21. In combination, a register comprising a set of numeral wheels, a driving gear for each numeral wheel, carrying mechanisms for carrying from one numeral wheel into another, a ratchet and pawl mechanism included in each carrying mechanism, an actuating shaft, a plurality of actuating wheels on said shaft, a set of teeth on each of said actuating wheels, the teeth on each actuating wheel being normally out of engagement with the driving gears of the numeral wheels, but the teeth on each actuating wheel being adapted to mesh with the driving gear of a different one of the numeral wheels and the sets of teeth on the several wheels being angularly displaced relative to each other, whereby the rotation of the actuating shaft will cause the successive advancement of the several numeral wheels.

22. In combination, a register comprising a set of numeral wheels, a driving gear for each numeral wheel, carrying mechanisms adapted to carry from one numeral wheel into another, a ratchet and pawl mechanism included in each carrying mechanism, an actuating shaft, a plurality of actuating wheels on said shaft, a set of teeth on each actuating wheel, the teeth on each wheel being adapted to mesh with the driving gear of one of the numeral wheels and the several numeral wheels being angularly displaced relative to each other whereby the rotation of the actuating shaft will cause the successive advancement of the several numeral wheels, and means for setting the numeral wheels simultaneously to the zero position.

23. In combination, a register comprising a set of numeral wheels, a driving gear for each numeral wheel, carrying mechanisms for carrying from one numeral wheel into another, a ratchet and pawl mechanism included in each carrying mechanism, an actuating shaft, a plurality of actuating wheels on said shaft, a set of teeth on each of said actuating wheels, the teeth on each actuating wheel being normally out of engagement with the driving gears of the numeral wheels, but the teeth on each actuating wheel being adapted to mesh with the driving gear of a different one of the numeral wheels and the sets of teeth on the several wheels being angularly displaced relative to each other, whereby the rotation of the actuating shaft will cause the successive advancement of the several numeral wheels.

24. In combination, a register comprising a set of decimally ordered numeral wheels, a driving gear associated with each numeral wheel, tens-carrying mechanisms for carrying from one numeral wheel into another, a ratchet and pawl mechanism included in each carrying mechanism to permit the forward rotation of a numeral wheel of one order without affecting a numeral wheel of lower order, a set of actuating mechanisms, each assigned to one order in the English monetary scale, and each comprising an actuating shaft, and several actuating wheels, said actuating wheels being adapted for successive operative engagement during a part of the revolution of the associated actuating shaft with a driving gear of a numeral wheel of the register, the ratio of gearing between the several actuating wheels of the actuating mechanism of any order and the several numeral wheels of the register being such that a single operation of the actuating mechanism will cause an advancement of the ordered numeral wheels by amounts whose sum is equal to the value of a unit in that order as expressed in units of the United States monetary scale, a shaft on which said numeral wheels are rotatably mounted, a ratchet and pawl connection between the numeral wheels and said shaft whereby the rotation of the shaft will advance the numeral wheels to their zero position.

25. In combination, a register comprising a set of ordered numeral wheels, a driving gear associated with each numeral wheel, a locating detent associated with each numeral wheel, carrying mechanism for carrying from one numeral wheel into another, a ratchet and pawl mechanism included in each carrying mechanism, an actuating shaft, an indicator associated therewith, a plurality of actuating wheels on said shaft, a set of teeth on each actuating wheel, the teeth on each actuating wheel being adapted to mesh with the driving gear of a different one of the numeral wheels, said teeth being normally out of engagement with the driving gears of the numeral wheels and the sets of teeth on the several wheels being angularly displaced relative to one another, whereby the rotation of the actuating shaft will cause the successive advancement of the several numeral wheels.

26. In combination, a register comprising a set of ordered numeral wheels, a driving gear associated with each numeral wheel, a locating detent associated with each numeral wheel, carrying mechanisms for carrying from one numeral wheel into another, a ratchet and pawl mechanism included in each carrying mechanism, an actuating shaft, a plurality of actuating wheels on said shaft, a set of teeth on each actuating wheel, the teeth on each actuating wheel being adapted to mesh with the driving gear of a different one of the numeral wheels, said teeth being normally out of engagement with the driving gears of the numeral wheels and the sets of teeth on the several wheels being angularly displaced relative to one another, whereby the rotation of the actuating shaft will cause the successive advancement of the several numeral wheels.

27. In combination, a register comprising numeral wheels, a carrying mechanism arranged to carry in accordance with one scale of notation and a plurality of separate actuating mechanisms connected therewith and ordered in accordance with a different scale of notation.

28. In combination, a register, and a plurality of actuating mechanisms therefor, all of said actuating mechanisms having a fractional ratio of transmission, the numerals of said fractional ratio being different and both of different value than unity.

29. In combination, a register comprising numeral wheels carrying in accordance with one scale of notation, and a plurality of separate actuating mechanisms ordered in accordance with a different scale of notation and each adapted to actuate the numeral wheels of the register in a certain fixed degree, a single operation by each actuating mechanism causing an actuation of the numeral wheels proportionate to the value of a unit in the said different scale of notation.

30. In combination, a register comprising decimally ordered numeral wheels, tens-carrying mechanisms associated therewith and a plurality of actuating mechanisms, each assigned to one denomination or order in some other scale of notation and each permanently geared to actuate the numeral wheels by an amount corresponding with the value of a unit of the denomination to which it is assigned.

31. In combination, a register comprising numeral wheels carrying in accordance with the United States monetary scale and actuating mechanisms permanently geared to actuate said numeral wheels in ratios corresponding with the value of units in the English monetary scale as expressed in units of the United States monetary scale.

32. In combination, a register and an actuating device therefor, and gearing permanently connecting the register and the actuating device in the ratio of the value of a unit in one system of notation as expressed in units of another system of notation.

33. In combination, a set of ordered numeral wheels, carrying mechanisms associated therewith, a set of separate ordered actuating mechanisms, each adapted upon operation to actuate the various numeral wheels different amounts corresponding with the value of a unit in the scale upon which the actuating mechanism is ordered as expressed in units of the scale upon which the carrying mechanisms carry from one numeral wheel into another.

34. In combination, a set of ordered numeral wheels, carrying mechanisms associated therewith and a set of ordered actuating mechanisms, each actuating mechanism being adapted upon operation to actuate directly two or more of the numeral wheels.

35. In a calculating machine, an actuating mechanism, controlling members ordered in accordance with one scale of notation for controlling the actuating mechanism, a registering mechanism, and fixed gearing between such actuating mechanism and such registering mechanism, such gearing adapted to operate such registering mechanism to indicate values in units of a system different from the system of units in accordance with which the controlling members are arranged to control the actuating mechanism.

36. In a calculating machine, an actuating mechanism, controlling members for the actuating mechanism arranged in accordance with one system of units, a plurality of registering mechanisms of different orders in another system of units, and separate sets of gearing between such actuating mechanisms and such registering mechanism, such sets of gearing adapted to operate such registering mechanism independently to indicate values in units of different orders of the second system of units.

37. In a calculating machine, separate actuating mechanisms having controlling members arranged in accordance with one system of units, a plurality of registering mechanisms of different orders in another system of units, gearing between such actuating mechanism and such registering mechanism, such gearing adapted to operate such registering mechanisms independently to indicate values in units of different orders of the second system of units, and means for operating one of such registering mechanisms from the registering mechanism of next lower order when such lower order of registering mechanism completes its cycle of operation.

38. In a calculating machine, a plurality of separate actuating mechanisms, suitably ordered operating members for the actuating mechanisms, a registering mechanism, and gearing between each of such actuating mechanisms and such registering mechanism, the ratios of such gearing being proportional to the relative values of the units of the several orders of the system employed in operating such actuating mechanisms, such registering mechanism adapted to indicate values in units of a system different from that employed in operating such actuating mechanisms.

39. In a calculating machine, a plurality of separate actuating mechanisms, a plurality of registering mechanisms, and gearing between each of such actuating mechanisms and such registering mechanisms, the ratios of the gearing between such actuating mechanisms and such registering mechanisms being proportional to the relative values of the units of the several orders of the system employed in operating such actuating mechanisms, such registering mechanisms adapted to indicate values in units of a system different from that employed in operating such actuating mechanisms, and means for operating one of such registering mechanisms from the registering mechanism of next lower order when such lower order registering mechanism completes its cycle of operation.

40. In a calculating machine, a plurality of operating shafts each assigned to a certain denomination in one system of notation, a register, and gearing between each shaft and such register, such gearing being adapted to advance such register for each rotation of the associated shaft an amount equivalent in units of one system to one unit in a second system.

41. In a calculating machine, a plurality of operating shafts corresponding to the different orders of units of a first system, a register, and gearing between such shafts and such register, the ratios of such gearing being proportional to the relative values of the units of the different orders of such first system, such gearing adapted to advance such register for each rotation of any of such shafts an amount equivalent in units of a second system to one unit of the order corresponding to the shaft operated.

42. In a calculating machine, a plurality of operating shafts corresponding to the different orders of units of a first system, a plurality of registers, and gearing between each of such shafts and each of such registers, the ratios of the gearing between any of such shafts and such registers corresponding to the relative values of the units of different orders of a first system adapted to be indicated by such registers, and the ratios of the gearing between such shafts and any one of such registers corresponding to the portions of the values of the units of the operating shafts occurring in the order to which the register belongs.

43. In a calculating machine, a plurality of operating shafts corresponding to the different orders of units of a first system, a plurality of registers, gearing between each of such shafts and each of such registers, the ratios of the gearing between any of such shafts and such registers corresponding to the relative values of the units of different orders of a first system adapted to be indicated by such registers, the ratios of the gearing between such shafts and any one of such registers corresponding to the portions of the values of the units of the operating shafts occurring in the order to which the register belongs, and gearing between each of such registers and the register of next higher order adapted to advance any of such registers except the one of lowest order one unit when the register of next lower order completes its cycle of operation.

44. In a calculating machine, a plurality of operating shafts corresponding to the different orders of units of a first system, a plurality of registers, gearing between each of such shafts and each of such registers, the ratios of the gearing between any of such shafts and such registers corresponding to the relative values of the units of different orders of a first system adapted to be indicated by such registers, such registers adapted to be operated consecutively by such gearing and to be normally out of engagement therewith, the ratios of the gearing between such shafts and any one of such registers corresponding to the portions of the values of the units of the operating shafts occurring in the order to which the register belongs, means for normally maintaining such operating shafts in zero position and means for returning such registers to zero position when desired.

45. In a calculating machine, a plurality of operating shafts, means for operating such shafts, means for normally securing such shafts in zero position a register, gearing between such shafts and such register, one rotation of each of such shafts corresponding to a unit of a corresponding order of a first system, such gearing adapted to move such register an amount for one rotation of any of such shafts proportional to the value of the corresponding unit in a second system adapted to be indicated by such register and means for returning such register to zero position when desired.

46. In a calculating machine, a plurality of operating shafts, means for operating such shafts, means for normally securing such shafts in zero position, a plurality of registers, gearing between each of such shafts and each of such registers, one rotation of each of such shafts corresponding to a unit of a corresponding order of a first system, such registers adapted to indicate units or different orders in a second system, one rotation of any of such shafts adapted to advance such registers to indicate the value of the unit of such first system corresponding to such shaft in units of the different orders of the second system corresponding to such registers, such gears adapted to operate such registers consecutively, and gearing between each of such registers and the register of next higher order adapted to advance any of such registers except the one of lowest order, one unit when the register of next lower order completes its cycle of operation.

47. In combination, a register provided with a plurality of separately rotatable numeral wheels, and a plurality of independent actuating mechanisms for different ones of said numeral wheels, each mechanism being geared to said numeral wheels in a fixed ratio of transmission.

48. In combination, a register provided with a series of numeral wheels, a plurality of shafts associated with said numeral wheels, and a separate actuating device driven by each shaft for actuating the numeral wheels a fixed amount upon each operation of said actuating shaft.

49. In combination, a register provided with a plurality of separately rotatable numeral wheels, and a plurality of independent actuating mechanisms, each mechanism comprising a set of actuating members geared to said numeral wheels in a predetermined ratio.

50. In combination, a set of decimally ordered numeral wheels, tens-carrying mechanism for carrying from lower numeral wheels into numeral wheels of higher order, an independent actuating mechanism for each order in the English monetary scale, and gearing connecting each actuating mechanism directly with the several numeral wheels in the ratio of the value of a unit of the order to which that actuating mechanism is assigned as expressed in the United States monetary scale.

51. In combination, a set of decimally ordered numeral wheels, tens-carrying mechanisms for carrying from each numeral wheel into a numeral wheel of higher order, ratchet and pawl mechanism included in each carrying mechanism, a separate actuating mechanism for each of the several orders in the English monetary scale, gearing connecting each actuating mechanism directly with the several numeral wheels in the ratio of one to the value of a unit of the order to which that actuating mechanism is assigned as expressed in the United States monetary scale, and means for resetting the numeral wheels simultaneously to their zero position.

52. In combination, a set of numeral wheels arranged in accordance with one scale of notation, carrying mechanism for carrying in accordance with that scale of notation from lower numeral wheels into numeral wheels assigned to higher denominations, an independent actuating mechanism for each of several denominations in another scale of notation, and gearing connecting each actuating mechanism directly with the several numeral wheels in the ratio of one to the value of a unit of the denomination to which that actuating mechanism is assigned as expressed in units of the scale of notation upon which the numeral wheels are arranged to carry.

In witness whereof, I hereunto subscribe my name this 10th day of January A. D. 1908.

CHARLES H. TALLMADGE.

Witnesses:
LEONARD W. NOVANDER,
FRED. O. HEUSER.